United States Patent [19]
Robles et al.

[11] Patent Number: 5,968,443
[45] Date of Patent: Oct. 19, 1999

[54] PROCESS FOR IN-MOLD LABELLING

[75] Inventors: Jorge Robles; William K. Mainquist, both of Pleasanton, Calif.

[73] Assignee: The Clorox Company, Oakland, Calif.

[21] Appl. No.: 08/609,365

[22] Filed: Mar. 1, 1996

[51] Int. Cl.$^6$ .................................................. B29C 49/24
[52] U.S. Cl. ........................................................ 264/509
[58] Field of Search ............................................ 264/509

[56] References Cited

U.S. PATENT DOCUMENTS

| | | | |
|---|---|---|---|
| 4,475,969 | 10/1984 | Reed | 156/152 |
| 4,853,169 | 8/1989 | Kaminski | 264/509 |
| 4,861,541 | 8/1989 | Kaminski et al. | 264/509 |
| 4,909,723 | 3/1990 | Slat et al. | 264/509 |
| 5,082,439 | 1/1992 | Kaminski | 425/504 |
| 5,242,650 | 9/1993 | Rackovan et al. | 264/509 |
| 5,254,302 | 10/1993 | Yamanaka | 264/129 |
| 5,435,963 | 7/1995 | Rackovan | 264/509 |

FOREIGN PATENT DOCUMENTS 59-093329  5/1984  Japan ................................. 264/509

OTHER PUBLICATIONS

Pulp and Paper Manufacture, 2d. Ed., vol. III, pp. 245–259.
The Manufacture of Pulp and Paper, pp. 99–105.
Analysis of Paper, 2d. Ed., pp. 10–13.
Wiley Encyclopedia of Packing Technology (1986), pp. 238, 424–429.
Plastic Blow Molding Handbook (1990) pp. 285–286, 469–470.

*Primary Examiner*—Catherine Timm
*Attorney, Agent, or Firm*—Joel J. Hayashida; Michael J. Mazza; Harry A. Pacini

[57] ABSTRACT

The invention provides a process, and an article of manufacture, in which a blown, hollow plastic article which has a paper label applied by in-mold labelling, must have the label positioned such that the longitudinal fibers thereof are oriented substantially with respect to the longest axis of the blown, hollow plastic article.

10 Claims, 2 Drawing Sheets

PROCESS FOR IN-MOLD LABELLING

BACKGROUND OF THE INVENTION

1. Field of the Invention

The invention relates to a process for in-mold labelling of hollow plastic articles such as blow molded bottles.

2. Brief Statement of the Related Art

Blown, hollow plastic articles, such as bottles, have been labeled with paper, plastic and foam labels. Plastic and foam labels can significantly increase the cost of producing bottles.

Moreover, besides the cost, plastic labels can be problematic when used in in-mold labelling without a release liner or carrier. Rackovan et al., U.S. Pat. Nos. 5,435,963 and 5,242,650, and Yamanaka, U.S. Pat. No. 5,254,302, represent techniques for improving the use of plastic films used for in-mold labelling. Other problems in the in-mold labelling of blow molded articles arises in the proper positioning of labels, plastic, paper or otherwise. In this respect, Kaminski et al., U.S. Pat. No. 4,861,541, and Kaminski, U.S. Pat. Nos. 5,082,439 and 4,853,169, all concern apparatuses and processes for advancing a web of labels and indexing them with respect to the interior of molds used for blow molding such that the labels are in proper registry with the blown article.

However, none of the foregoing art teaches, discloses or suggests that the orientation of the longitudinal fibers in a paper label is a critical consideration in its placement on a blown, hollow plastic article. Further, none of said art teaches, discloses or suggests this critical orientation when the hollow article produced has a non-circular cross-section. There has thus been a failure to recognize in the prior art the problem caused by conventional orientation of the longitudinal fibers in paper labels used in in-mold labelling, and a further failure to rectify this problem.

SUMMARY OF THE INVENTION AND OBJECTS

The invention provides a process, and an article of manufacture, in which a blown, hollow plastic article which has a paper label applied by in-mold labelling, must have the label positioned such that longitudinal fibers thereof are oriented substantially with respect to the longest axis of the blown, hollow plastic article.

It is therefore an object of this invention to prevent, or mitigate, blemishes in the label which arise in the in-mold paper labelling of blown, hollow plastic articles.

It is another object of this invention to deliver a cost-effective blow molded article with a label adhered by in-mold labelling.

It is a further object of this invention to orient the longitudinal fibers of a paper label substantially with the longest axis of the label surface on the blown, hollow article.

It is yet another object of this invention to orient the strength of a paper label applied to a blown hollow article by in-mold labelling, orienting the strength of said label with respect to the longest axis of the blown article.

It is a still further object of this invention to avoid or mitigate deformation in blown, hollow articles, where said deformation occurs as a result of conventional orientation of a paper label during the in-mold labelling.

DETAILED DESCRIPTION OF THE INVENTION

As stated above, the invention provides a process for making, and an article of manufacture for, an in-mold labelled hollow plastic article, comprising a paper label having longitudinal fibers, the longitudinal fibers oriented to register substantially with the longest axis, which typically is the vertical axis, of the blown article.

Paper is a very effective material for use in making labels. There are many sources of such labels and they are typically of various desirable thicknesses, commonly referred to in the industry as "basis weights." For example, paper weights used herein can vary from 15–100 lb. weight, without limitation. Paper, of course, can be made by numerous methods which typically are dependent on the type of machine utilized. However, most paper making machines are variations of the standard fourdrinier machines. Examples of paper making operations are set forth in Straus, "Paper Making Machines; the Fourdrinier," in: *Pulp and Paper Manufacture*, Vol. III, entitled *Paper Making and Paperboard Making* (McGraw Hill 2d Ed.); B. L. Browning, *Analysis of Paper*, (Marcel Dekker 2d Ed.) pp. 10–13; Burdette et al., *The Manufacture of Pulp and Paper, Science and Engineering Concepts* (TAPPI Press), pp. 99–105; and Bakker, *The Wiley Encyclopedia of Packing Technology* (1986), pp. 238–239; all of which references are incorporated herein by reference thereto.

Conventionally, paper labels are printed such that the label's longer axis is oriented perpendicularly to the longitudinal fibers of the paper roll or web. This may have been done so as to make maximum use of the area of the paper for producing labels with minimal scrap. As demonstrated by the invention, the applicants have discovered that orienting the paper labels with the longitudinal fibers being in line with the longest axis of the bottle mitigates or avoids bottle deformation and label blemishes. The paper rolls which are used for labels come in various widths and the label graphics, text and other artifacts are applied by various techniques known to those skilled in the art, such as offset, etching, engraving, hot-stamping, and the like. Labels are loaded into the molds of the blow molding machine in various ways, such as by a magazine (where precut labels are used).

Figure 1:
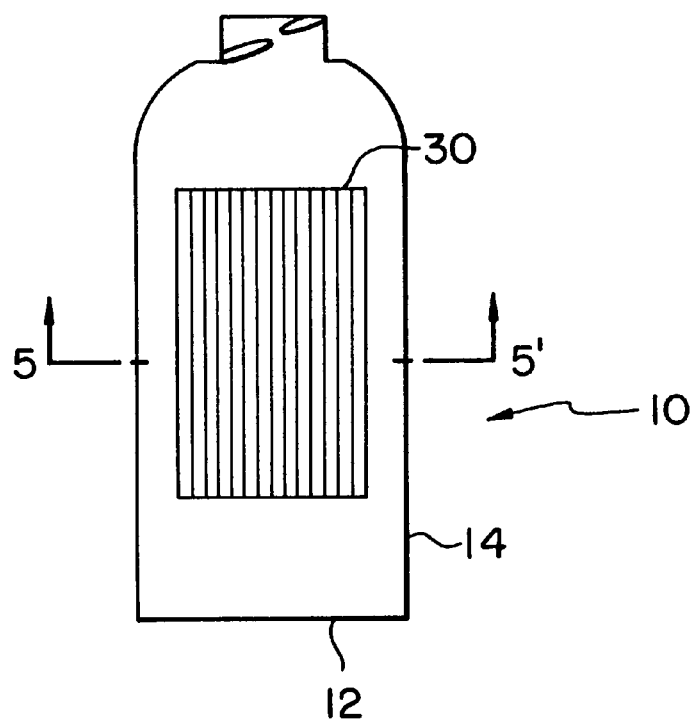
FIG. 1 is a front elevational view of a blown hollow article bearing a paper label affixed by in-mold labelling techniques.

Referring now to the drawings, FIG. 1 depicts a typical hollow, blown plastic article of the invention, namely a blow molded bottle 10. The typical plastic used for such blow molding is high density polyethylene, although polypropylene and other types of thermoplastic polymers are suitable for use. The bottle 10 has an end panel 12, from which depends a continuous wall 14 forming the body of the bottle. The continuous wall 14 narrows into a depending finish 16, which is typically threaded. The threaded finish 16 will mate with a similarly threaded closure, although other types of closures are, of course, possible. A paper label 30 is affixed to bottle 10 by means of the in-mold labelling process.

Figure 2:
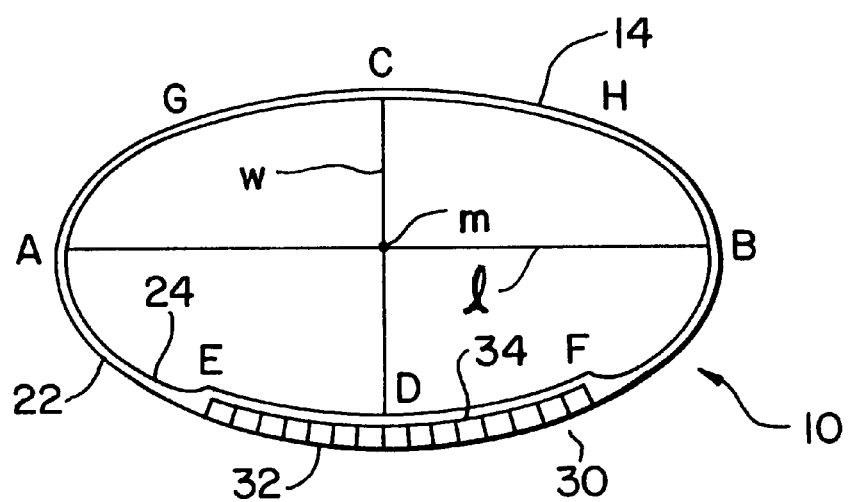
FIG. 2 is a cross-section taken along lines 5–5', of the blown, hollow article of FIG. 1.

Referring now to FIG. 2, which is a cross-section of the bottle 10 of FIG. 1 taken along lines 5–5', it can be seen that the cross-sectional area of bottle 10 is non-circular. Continuous wall 14 comprises outside surface 22 and internal surface 24. Affixed to one side of continuous wall 14 is at least one paper label 30 comprising an upper surface 32 and an internal surface 34, which adheres directly to upper surface 22 of continuous wall 14. Because air injected into the bottle mold pushes the fluid plastic outwardly to the limits of the mold cavity, the outward surface of label 30 and upper surface 22 will be flush. Further, the non-circular cross-section is referred as having a length and a width. For example, a line extending from point A through midpoint m ending at point B defines one dimension of the bottle, namely the length, 1, while a line drawn from point C through midpoint m to point D represents another, shorter dimension, namely, the width, w. Thus, line A–B defines the length 1, while line C–D defines the width w. The surfaces defined by the line E-D-F on one side, and G-C-H, on the other side are gently curved surfaces which typically define the label panels. Within the mold cavity, the paper label can be placed between the preform or parison and that portion of the interior of the mold cavity corresponding to the label panel. The strongly curved surfaces of the cross-section, on the other hand, which are defined by curves G-A-E and H-B-F, are less likely to be labelled since the mold halves of the blow molding apparatus will typically partition at the apexes of such curves.

It has been observed that conventional positioning of paper labels on the label surfaces leads to blemishes in the label, deformations in the bottle, and the like, in the in-mold labelling process. Although the cross-section is referred to as non-circular, a square or rectangular cross-section is possible, but substantially elliptical, oval and capsular cross-sections are most preferred, in terms of appearance and ease of manufacture. An oval cross-section is depicted in FIG. 2.

Figure 3:
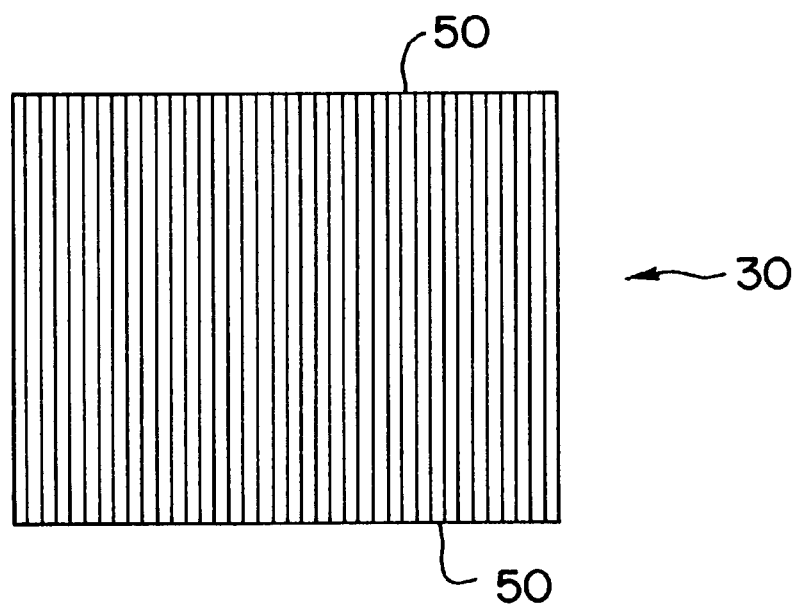
FIG. 3 is an example of the paper label of the present invention.
Figure 4:
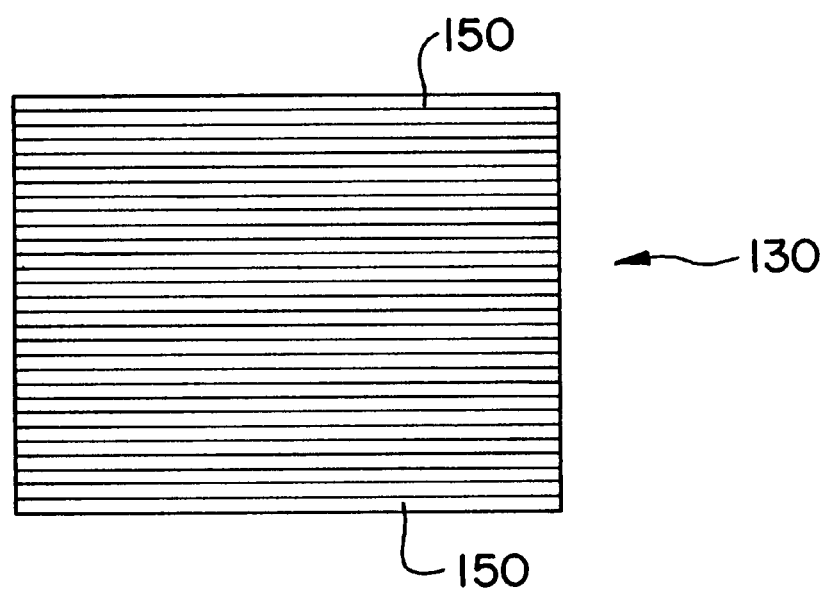
FIG. 4 is an example of a comparative paper label.

Turning now to FIG. 3, an inventive label of the invention is depicted. Label 30 has longitudinal fibers 50 oriented in a north/south direction. This label would be adhered to bottle 10 so that the longitudinal fibers 50 would be oriented to register with the longest axis (here, vertical) of the bottle 10. In FIG. 4, a comparative label 130, having its longitudinal fibers 150, 150, would be applied to a bottle, such as 10, such that the longitudinal fibers 150 are perpendicular with respect to the longest axis of such bottle 10.

It has been discovered that comparative labels, such as depicted in FIG. 4, may suffer separation, produce blemishes, incomplete contact, and wrinkling of the paper label, when such label is applied to a blown bottle in an in-mold labelling process. Further, the bottle itself can deform, caused by the non-identical contraction properties of the paper label and the blown bottle during cooling.

As is well known, in in-mold labelling, labels are introduced into the molding chambers, or halves, of the blow molding machine (not shown) and held in such halves by vacuum or other retaining means. The mold halves are then closed around a preform or parison, and air is injected into the parison to cause it to expand within the cavity of the mold halves, to produce the blow-molded article. The paper label retained within the mold usually contains a heat-activated adhesive.

In the invention, it was determined that a bottle having a non-circular cross-section would be subject to blemishes, incomplete adherence of, and wrinkles in, the paper label, as well as bottle deformation, when the longitudinal fibers in such paper label were conventionally oriented. Applicants believe without limitation that the direction of predominant strength of the paper label will have an effect on the resulting appearance of the blown bottle. When the longitudinal fibers are oriented perpendicularly with respect to the longest axis of the bottle and the label is placed on the surface joining the width of the bottle, such fibers are, in fact, at their stiffest in the short axis. As the thermoplastic material contacts the label, it adheres to the label. As the thermoplastic material begins to cool (for example, the mold is usually equipped with a cooling jacket), the thermoplastic material begins to harden and pulls away from the label. However, because the horizontally oriented fibers have a tendency to maintain their strength, the thermoplastic material begins to bow away from the label, resulting in blemishes, wrinkling, in the label, and, deformation in the resulting bottle. Further, the bottle continues to cool and harden after it is ejected from the mold.

By contrast, when the fibers of the paper label are oriented in the longest axis, and the label is positioned on the label surface on the bottle, the strength of the paper is aligned with the longest axis of the bottle. Thus, when the thermoplastic material begins to cool and to shrink, the paper label will yield more readily to the hardening plastic and collapse internally along therewith. As a result, the paper label blemishes and wrinkles, and bottle deformations which occur in the comparative example, are avoided or substantially mitigated.

The foregoing description characterizes the invention solely for the purposes of exemplification and is not intended to restrict the scope or embodiments of the invention. The invention is further illustrated with reference to the claims which follow hereto.

We claim:

1. A process for in-mold labelling of hollow plastic articles, said process comprising:

a) introducing into at least one of a pair of mold halves a paper label, said paper label having a majority of longitudinal fibers oriented in one direction;

b) orienting said paper label so that it has the majority of said longitudinal fibers oriented to register substantially with the longest axis of a to-be-formed hollow article;

c) closing said mold halves about a preform or parison; and d) injecting air into said preform or parison to expand said preform or parison into the cavities of each mold half so as to produce a blow-molded, hollow article.

2. The process of claim 1 wherein the hollow article produced has a non-circular cross-section.

3. The process of claim 1 wherein said label is introduced via a magazine.

4. The process of claim 1 wherein each said label is held in place in said mold half by retaining means.

5. The process of claim 4 wherein said retaining means comprises vacuum means.

6. A process for in-mold labelling of a blown, hollow plastic article having a non-circular cross-section, said process comprising registering at least one paper label, with a majority of longitudinal fibers oriented in one direction, in a mold half such that said majority of longitudinal fibers of said paper label are substantially oriented to the longest axis of the blown, hollow articles.

7. The process of claim 6 wherein the orientation of said longitudinal fibers determines the direction of predominant strength of said paper label.

8. A process for in-mold labelling of a blown, plastic article having a non-circular cross-section, said process comprising a) placing into a mold half at least one paper label, said paper label having a majority of its fibers oriented in a longitudinal direction, b) positioning said paper label so that majority of said fibers are oriented substantially in parallel with the longest axis of said mold half, c) positioning a plastic parison so that the paper label is between the cavity of said mold half and the outer wall of said parison; and d) injecting air into said parison so that the parison is expanded into the cavity of said mold half.

9. The process of claim 8 wherein said hollow article is capsular in cross-section.

10. The process of claim 9 wherein the action of expanding said parison into said cavity adheres said label to the resulting hollow article.

\* \* \* \* \*